June 24, 1930.  A. R. KRAUSE  1,767,246
TREAD FORMING AND FINISHING MACHINE
Filed May 3, 1926    9 Sheets-Sheet 1

Patented June 24, 1930

1,767,246

UNITED STATES PATENT OFFICE

ARNOLD R. KRAUSE, OF EAU CLAIRE, WISCONSIN, ASSIGNOR TO GILLETTE RUBBER COMPANY, A CORPORATION OF WISCONSIN

TREAD FORMING AND FINISHING MACHINE

Application filed May 3, 1926. Serial No. 106,357.

This invention relates to a tread building machine for preparing tread stock prior to application thereof in pneumatic tire building.

It is an object of this invention to provide a machine adapted to continuously build up extruded tread rubber stock by applying breaker fabric and cushion rubber stock thereto as, and in step with, the stock issuing from an extruding or tread stock forming machine, means being also provided for cutting the completed tread stock into predetermined lengths ready for application to pneumatic tire carcasses.

It is also an object of this invention to provide a machine of the class described driven in adjustable relationship to the speed of production of the tread rubber stock.

It is another object of this invention to provide means for storing and feeding prepared breaker fabric onto the tread rubber stock whereby a large quantity of fabric can be cut and spliced at intervals so that the operator can devote most of his time to supervising the operation of the balance of the tread building mechanism.

Still another object of this invention is to provide cushion stock feeding means permitting continuous operation of the tread building machine.

It is still a further object of this invention to provide a simplified mechanism for building up tread stock and cutting it to length in a single continuous process in step with the forming of the tread rubber stock itself.

Other and further important objects of this invention will be apparent from the disclosures in the specification and the accompanying drawings.

This invention (in a preferred form) is illustrated in the drawings and hereinafter more fully described.

On the drawings:

Figure 5 is a rear view corresponding to Figure 4.

As shown on the drawings:

Figure 4:
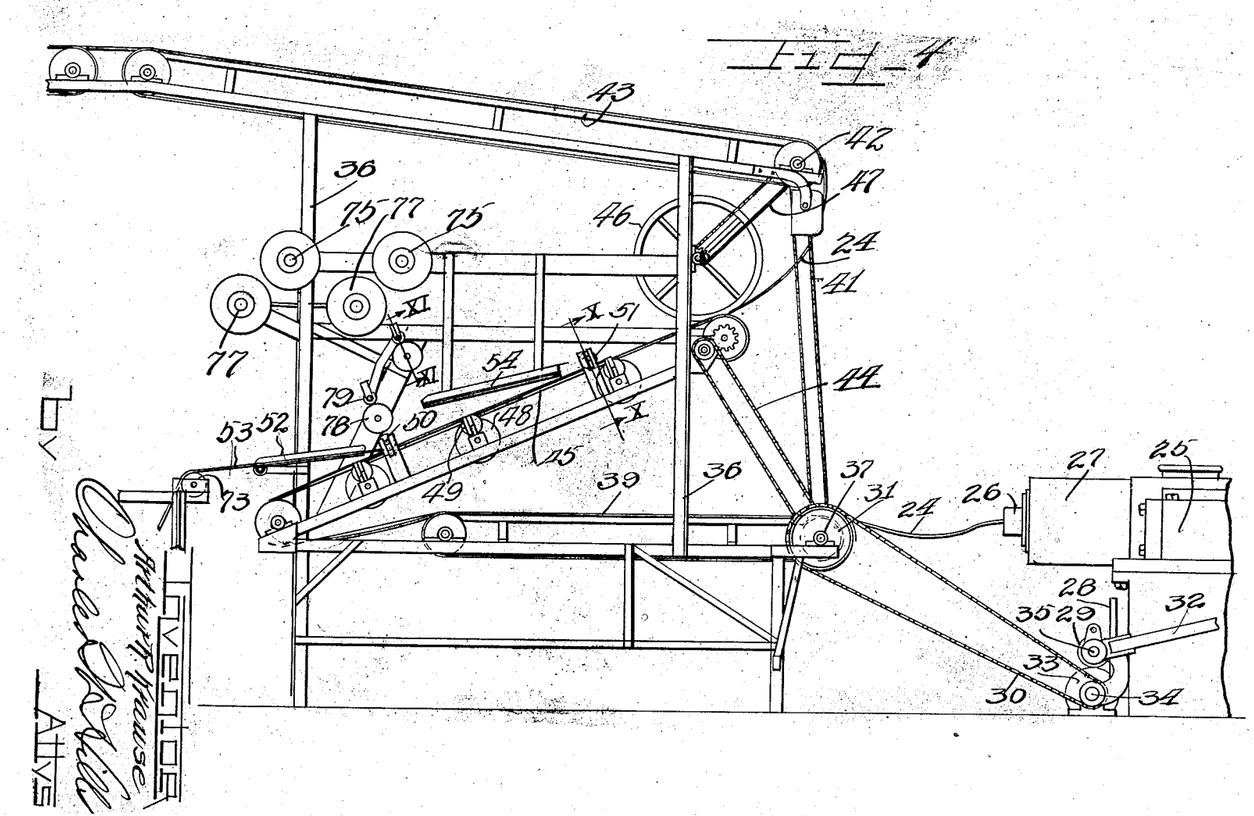
Figure 4 is a front elevation of the tread building apparatus which applies breaker and cushion strips to the tread stock proper.
Figure 6:
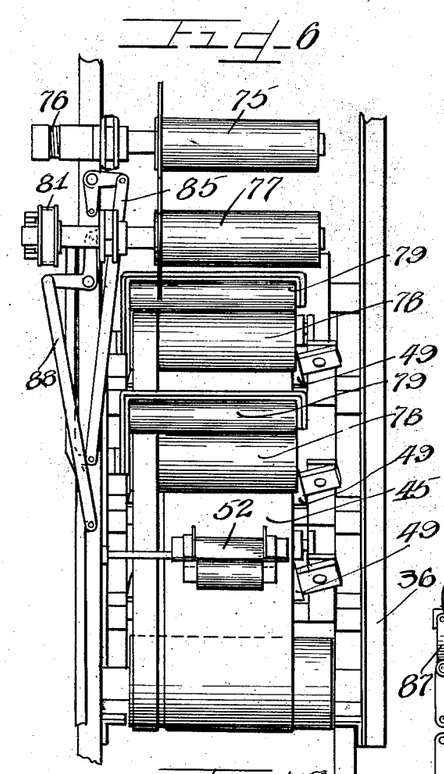
Figure 6 is an end view of the tread building apparatus taken from the left of Figure 4.
Figure 7:
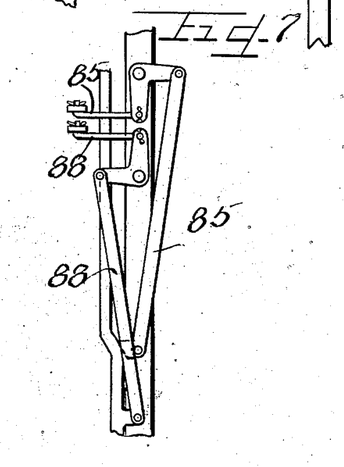
Figure 7 is a fragmentary detail elevation of the dual clutch controls for the cushion feed rolls.
Figure 8:
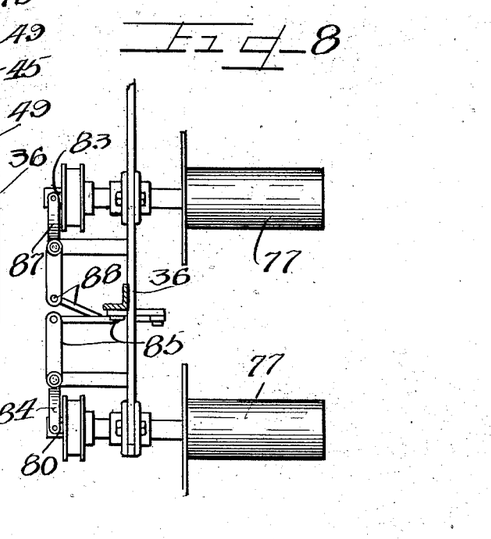
Figure 8 is a fragmentary detail plan view of the clutch control and feed rolls.

While forming no part of the present invention, sufficient structure has been shown to make clear the delivery of the raw stock 24 from an extruding machine 25, the forming dies 26 and cylinder 27 being indicated in Figure 4 together with a friction disc 28 and adjustable wheel 29, which drives a chain 30 leading to a sprocket 31 on the tread building machine proper, to provide a drive in adjustable relationship to the speed of extrusion of the tread stock, the friction disc 28 being mounted on a part of the operating mechanism of the extruding machine. A throw-out lever 32 is provided to move the friction wheel out of contact with the disc to stop the drive. In the illustration, a pair of reduction gears 33 are shown with the chain driven off the reduced speed shaft 34, the friction wheel shaft 35 and lever 32 being pivoted about the shaft 34 so that the gearing 33 is maintained in constant mesh.

The tread stock building machine proper has its elements mounted on a skeleton steel framework to which the general reference numeral 36 has been applied for the reason that the particular form of the framework is unimportant and serves only to tie the various elements into proper operating relationship. For this reason no further particulars of this frame are believed to be necessary in connection with the description of the machine itself.

The sprocket 31 previously mentioned is mounted on a shaft 37 journaled on the framework 36 which shaft carries the driving roll 38 of a horizontal belt conveyor 39, receiving the tread material from the extruding machine. This shaft also carries a sprocket 40 and chain 41 driving a shaft 42 carrying the driving roll of an overhead conveyor 43 receiving the completed tread strip, and another sprocket on the shaft 37 also drives, by means of a chain 44, the driving roll of an inclined belt conveyor 45 upon which the tread building process occurs. In order to provide for completing an extruded tread strip after shutting down the extruding machine, a hand wheel 46 is provided with a chain drive 47 to the shaft 42, which in turn actuates both the other conveyors.

Figure 9:
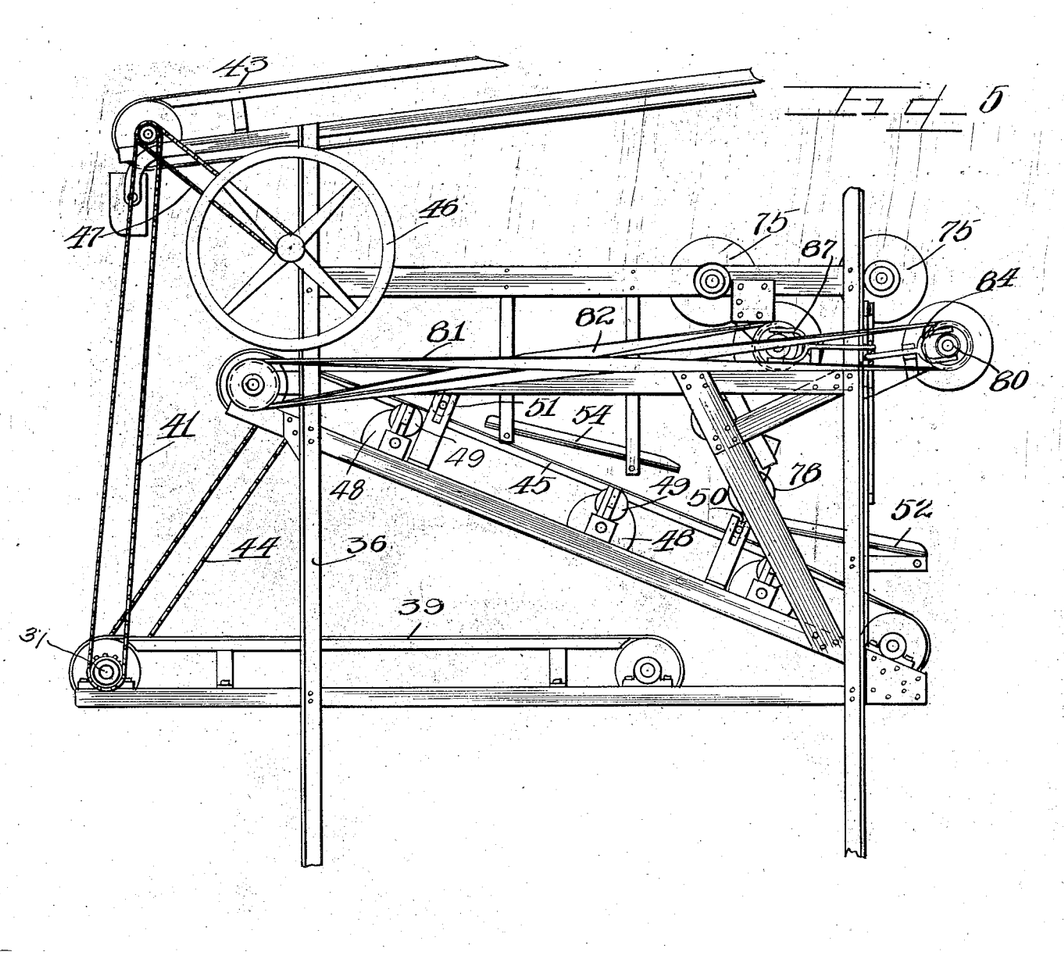
Figure 9 is a detail of one set of tacking rollers.
Figure 10:
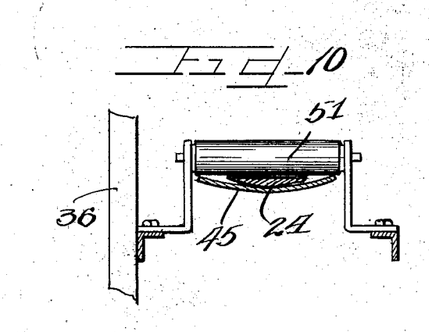
Figure 10 is a section on the line X—X of Figure 4.
Figure 11:
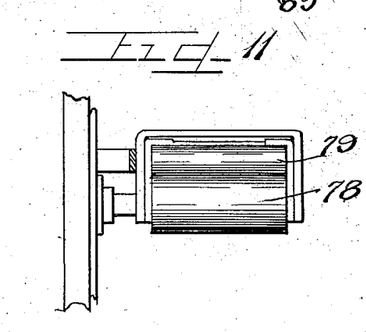
Figure 11 is a section on the line XI—XI of Figure 4.

The upper belt of the inclined conveyor 45 is supported by three sets of rolls as shown in Figure 9, a central cylindrical roll 48 and oppositely disposed inclined rolls 49, intended to give the surface of the belt a trough shape conforming in general to the outline of an inverted tread strip. Pressing rolls 50 and 51 are mounted above the surface of the belt adjacent two of these sets of rolls, but preferably not aligned therewith, to permit the natural elasticity of the belt 45 to exert pressure over the entire surface of the tread stock as shown in Figure 10, thus producing the same result as a series of different contoured rollers, each exactly conforming to the varying sizes and forms of tread strips operated upon at different times. In effect, this produces a universal machine providing, without adjustment or change, for varying sizes of tread stock.

Figures 19, 20, 21, 22:
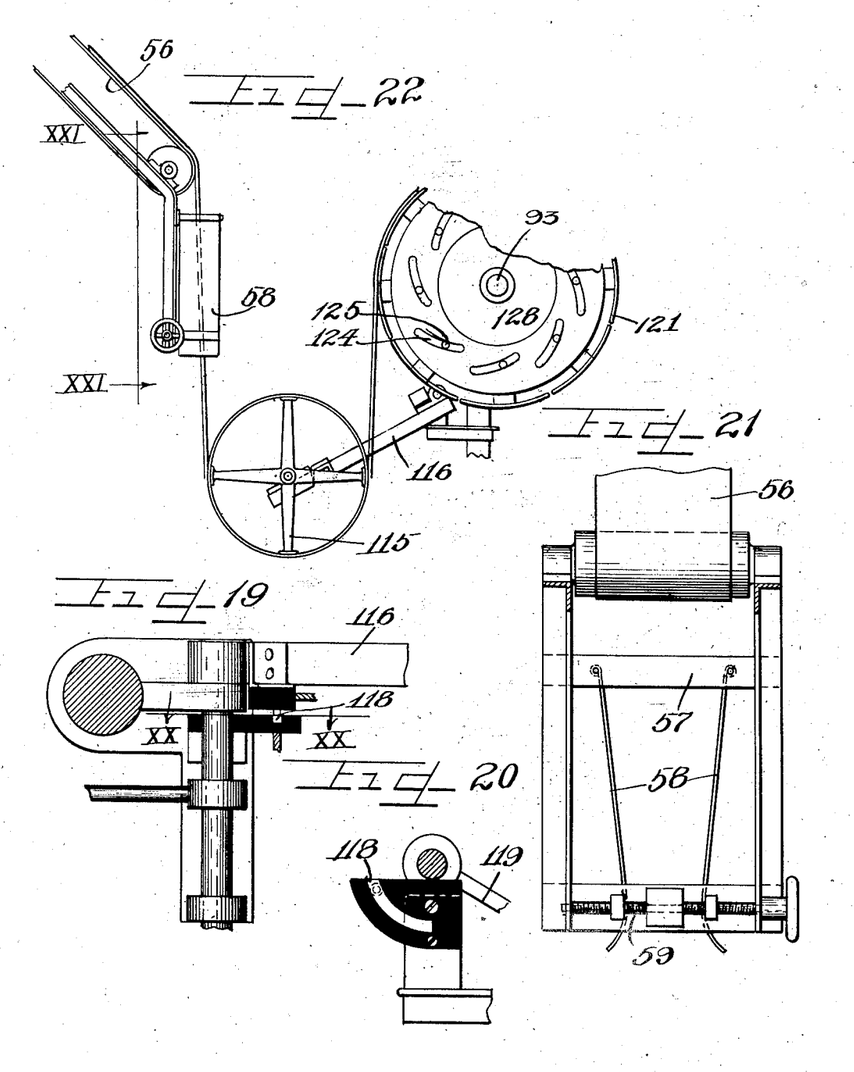
Figure 19 is a fragmentary section on the line XIX—XIX of Figure 12, showing the switch controlling the measuring wheel drive.
Figure 20 is a section on the line XX—XX of Figure 19.
Figure 21 is a rear fragmentary elevation of the adjustable guide taken on the line XXI—XXI of Figure 22.
Figure 22 is a fragmentary detail showing the delivery of completed stock to the measuring and cutting mechanism.

A guide 52 feeds breaker fabric 53 on top the inverted tread strip just before the strip passes under the first presser roll 50, which tacks the fabric in place on the tread. A second guide 54 feeds cushion stock onto the breaker and tread just prior to reaching the second presser roll 51. The tread strip itself is picked up, as extruded, by the lower conveyor belt 39 and is thus fed to the lower end of the inclined belt 45 where the tread building occurs. The bend in the tread caused by the shift from one conveyor to the other inverts the tread strip. From the inclined conveyor belt 45, the completed tread stock passes up over the overhead conveyor 43 and thence over additional overhead conveyors 55 and 56 to a centering guide-way 57, having adjustable sides 58 operated by the screw 59, as shown in Figure 21, to center the stock as fed to a measuring and cutting machine to be described hereinafter.

Figure 1:
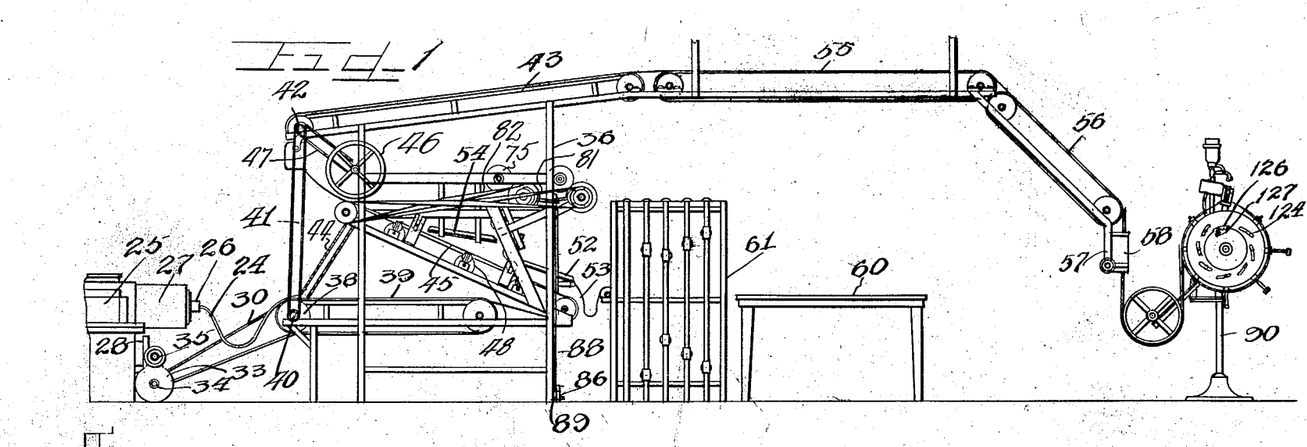
Figure 1 is an assembly view including all the elements of the present invention required to produce tread strips ready for application to a tire carcass.
Figures 2, 3:
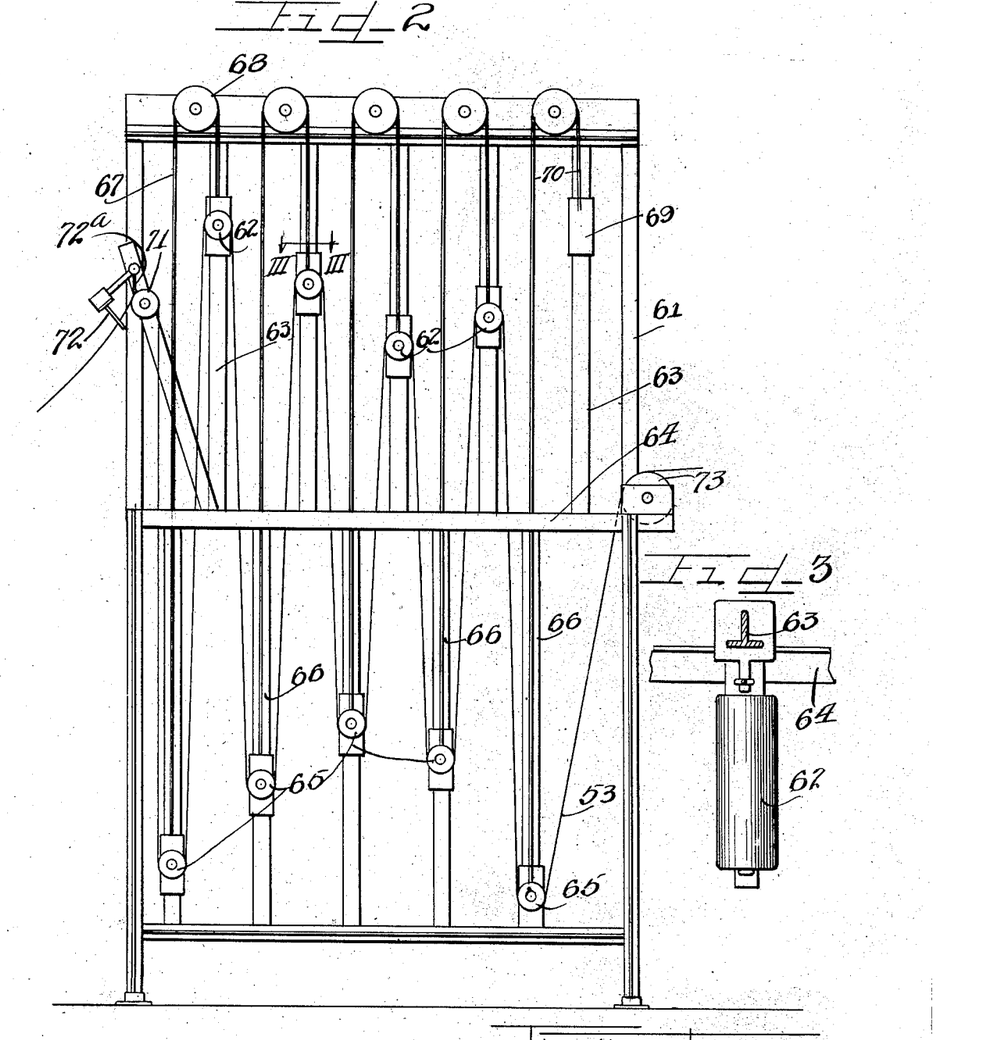
Figure 2 is an enlarged detail elevation of the breaker strip storage and feeding rack.
Figure 3 is an enlarged detail of one roll of the storage rack taken on the line III—III of Figure 2.

The breaker strip, which is applied to the tread stock prior to the addition of the cushion rubber stock, is cut to width on a table 60 and spliced into continuous lengths, a considerable length being prepared at intervals and stored on the frame work 61, shown in Figure 2, for the reason that the material is frictioned fabric which is sticky and therefore cannot be rolled up unless a cloth backing fabric is applied to one side thereof. The framework 61 carries a series of rolls 62 slidably mounted on guides 63 and movable between the top of the framework and the central bar 64. A second series of similar rolls 65 are mounted on guides 66 below the bar 64 in staggered relationship to the upper guides, the first lower roll being counterbalanced by a cord 67 passing over a pulley 68 and connected to the first upper roll, the remaining upper and lower rolls being similarly paired off, an odd lower roll being balanced by a weight 69 on the cord 70. In using this storage rack, the prepared breaker strip is passed over a stationary roll 71, a guiding fork 72 serving to center the fabric. A series of stripping fingers 72ᵃ are provided to bear down on the breaker fabric to prevent folds in the fabric from passing over the stationary roll into storage because of the tacky nature of the fabric which tends to pick up adjacent folds that happen to overlap during the cutting process. As the operator splices the various lengths into one long length, he pulls the material over the stationary roll 71 and by pushing down on the lower rolls 65, expands the storage capacity to a maximum, the fabric being drawn off the storage rolls over a delivery roll 73 by the pull of the tread stock as it advances on the inclined conveyor.

The cushion stock previously referred to is prepared in rolls with a cloth backing piece applied to one side of the stock to prevent the layers from sticking together. Prior to applying this stock to the tread, it is necessary to remove the backing cloth, and as the rolls of friction stock are quickly used up, it has been found desirable to duplicate the feeding mechanism so that one roll can be set up ready to be switched over to as soon as the other roll is used up. As these mechanisms are exact duplicates up to and including the driving clutches, one set of numerals will be applied to both.

The roll of cushion stock is mounted on an idler roll 75 having a light spring brake 76 bearing against the bearing support, the stock being pulled off the roll by means of a driven or wind-up roll 77 for the backing cloth, the end of which is separated from the cushion stock and attached to the roll. Sufficient stock is pulled off the roll to allow the freed end of the stock to be laid over the guide (54) and tacked to the tread over the breaker strip, after passing between the guide rolls 78 and 79 mounted above the guiding trough. Because of the great elasticity of the cushion rubber stock, it is advisable to pull the stock off the roll by means of the backing cloth, winding up on the driven roll 77 operated through the clutch 80 by a belt 81 driven from the driving shaft of the inclined conveyor 45. A similar belt 82 drives the clutch 83 of the second pair of feed rolls, the clutch 80 being controlled by a fork 84 and linkage 85 leading to a conveniently located foot lever 86, and the clutch 83 being controlled by a fork 87 and linkage 88 leading to a second foot lever 89.

As previously mentioned the completed tread strip passes up onto the overhead conveyors 43, (55), and (56), and thence through the adjustable guides 58 to a separately driven and controlled measuring and cutting machine intended to operate in synchronism with the tread building machine. This machine embodies a unitary self-contained mechanism mounted on a pedestal or post 90, a bracket 91 forming the support for the device proper and being secured to the post by any suitable means forming as part of the support.

Figures 12, 14:
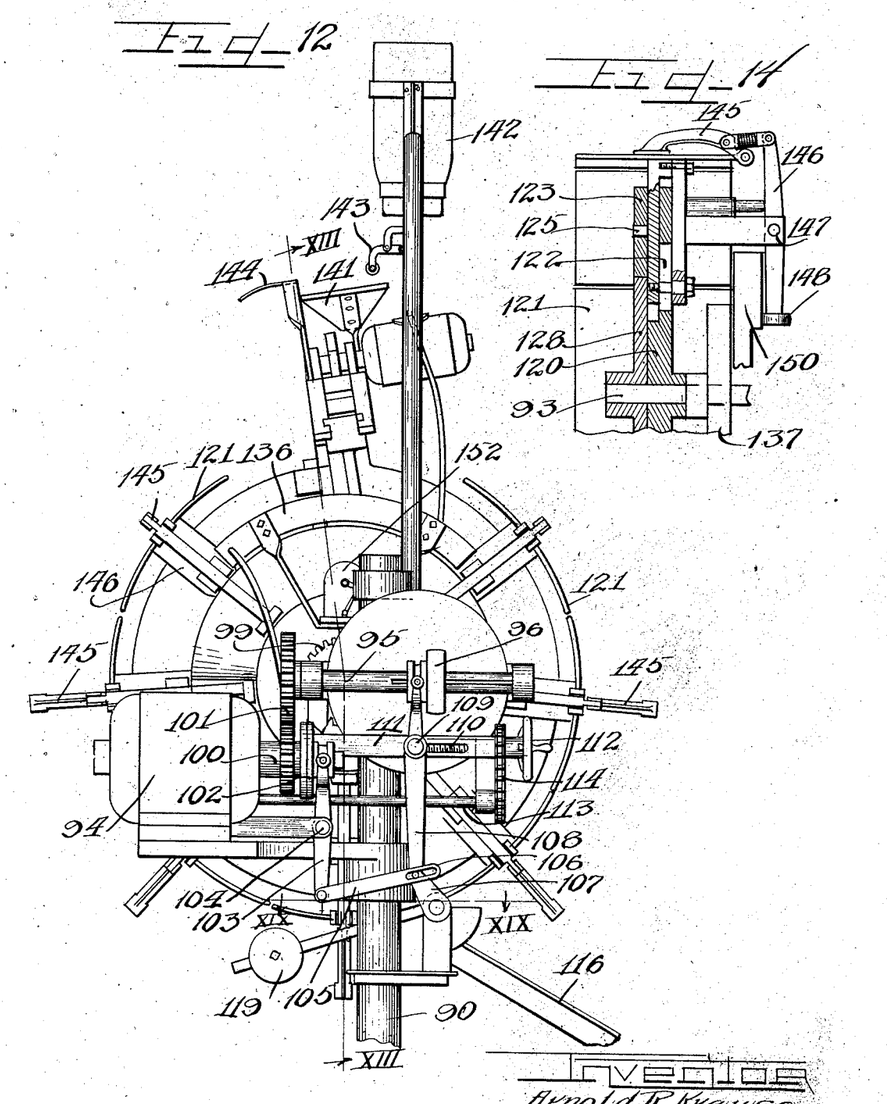
Figure 12 is a rear elevation of the measuring and cutting mechanism.
Figure 14 is a fragmentary detail showing the adjustment of the segments.
Figure 13:
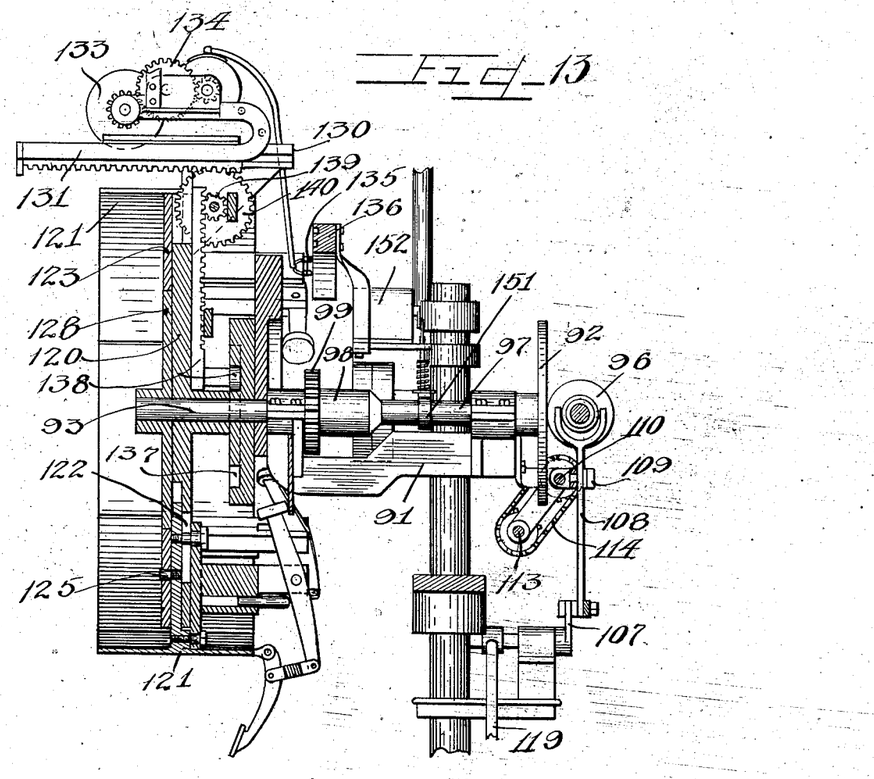
Figure 13 is a section thereof on the line XIII—XIII.
Figure 15:
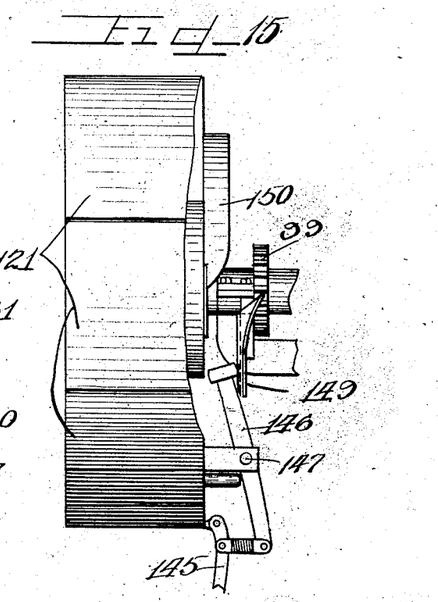
Figure 15 is a fragmentary detail with parts omitted to show the operation of the clamping fingers.
Figures 16, 17:
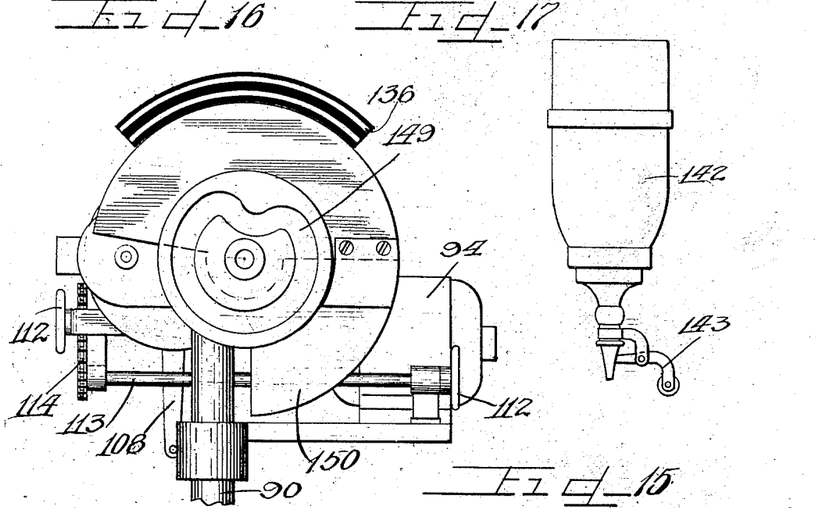
Figure 16 is a detail showing the cam for traversing the cutter mechanism.
Figure 17 is an enlarged elevation of a lubricant supplying device for the cutter mechanism.
Figure 18:
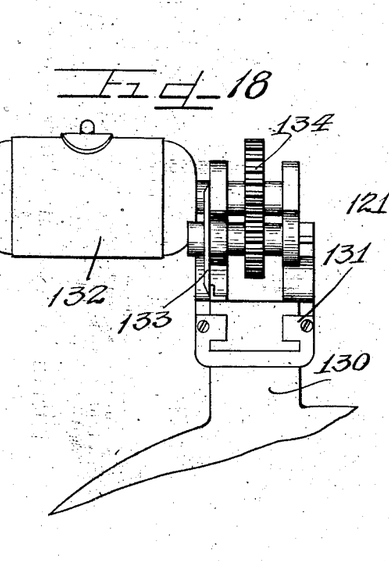
Figure 18 is an enlarged fragmentary elevation of the cutting mechanism.

A main shaft 93 is journaled in the bracket 91 and is driven by the motor 94 which drives a shaft 95 carrying a friction wheel 96, engaging a friction disc 92 on a shaft 97 leading to a double reduction gear box 98 and thence to the main shaft by the gears 99, as most clearly shown in Figure 13. The drive from the motor 94 to the shaft 95 includes the gears 100 and 101, gear 100 engaging the motor shaft by means of a clutch 102 operated by a lever 103 pivoted at 104. The opposite end of this lever carries a link 105 having a lost motion connection to a pin 106 on the crank 107, the pin 106 also acting on a pivoted lever 108, the other end of which acts to shift the friction wheel 96 across the face of the friction disc 95 to give varying speed ratios. It will be evident from the above, that within the range permitted by the lost motion connection, the lever crank 107 and pin 106 act as a speed control, while when the lost motion is taken up to the left in Figure 12, the link 105 serves to throw out the clutch and therefore stop the mechanism. The fulcrum 109 for the lever 108 is mounted on a threaded shaft 110, the pivot sliding in a slot in the plate 111; a hand wheel 112 serving to rotate the threaded shaft to shift the fulcrum 109 to vary the automatic speed control range. To provide for manual control from the other side of the machine, a shaft 113 is connected to the shaft 110 by the chain 114, and a second hand-wheel is mounted on the free end of the shaft. The speed control is governed by an idler pulley 115, mounted on a swinging lever 116 on the shaft 117, which also carries the crank 107. The idler pulley rides on the slack or loop of the incoming stock and as this loop is shortened it lifts the pulley 115, acting thereby to shift the friction wheel outwardly over the friction disc to slow down the movement of the measuring device carried by the main shaft. The reverse action takes place upon the loop increasing in size so that the machine is speeded up to keep it in step with the supply of stock. The lost motion link serves to stop the mechanism upon stoppage of the supply of stock, while a switch 118 is provided in connection with the pulley lever 116 to stop the motor when the slack has been taken up to the limiting amount desired to prevent undue tensioning of the stock. The pulley arm or lever 116 is partly balanced by a counterweight 119.

The main-shaft 93 carries a disk 120 on which are mounted a series of radially movable peripheral segments 121 bolted thereto thru slots 122. A second disc 123 with inclined or spiral slots 124 for pints 125 attached to the segments 121 serves to provide for simultaneous and equal adjustments of the segments, a curved rock 126 on the disc 123 meshing with a pinion 127 on a disc 128 secured to the disc 120; manual rotation of the pinion serving to shift the disc 123 relative to the disc 120 and thereby shifting the segments 121 as desired. The rack and pinion are desirable but not essential elements as they simply add to the convenience and accuracy of the adjustment of the segments to produce a predetermined length of stock.

One segment of the circle is replaced by a bracket 130 on the disc 120 forming a guideway over which slides a carriage 131 carrying a motor 132 driving a circular cutting knife 133, by means of gearing 134. The motor is intermittently energized thru the contact members 135 and contact block 136 as the measuring wheel revolves to bring the cutter into vertical position. The cutter carriage 131 is traversed over the shear or bracket 130 by means of a cam groove 137, fixed on the bracket 91 about the main shaft, a cam follower 138 engaging the cam and having rack teeth engaging a gear 139 attached to a larger gear 140 which acts on the carriage.

Rubber and some other materials are more easily cut if a lubricant is supplied to the cutting edge, so that a hopper 141 is secured to the cutter carriage and a stationary fount or inverted bottle 142 is mounted over the machine with a contact valve 143 adapted to be opened by a tappet 144 carried by the carriage.

Each segment of the wheel is provided with a hinged presser foot 145 for holding the material thereagainst, the foot being hinged to the edge of the segment and operated by the lever 146 pivoted at 147 to the segment plate to be unaffected by the adjustment thereof. The inner end of the lever 146 carries a roller 148 engaging under a face cam 149 to depress that end of the lever and open the presser foot and engaging over another cam 150 to lift the roller to apply the presser foot. The two cams 149 and 150 are so arranged that the presser feet engage the material on segment only when on the upper part of the wheel, dropping free from the segment as they swing underneath during the revolution of the wheel to release the material.

A cam 151 is formed on the main shaft to engage a tappet 172 operating a counting mechanism 152 for recording the revolutions of the wheel and hence the number of pieces cut.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A tread building machine, comprising a conveyor belt for receiving tread rubber stock in an inverted position, breaker fabric feeding mechanism positioned adjacent said belt, means for applying said fabric from said feeding mechanism to the rubber stock on said belt, cushion rubber holding mechanism arranged for cooperation with said belt, means for removing the backing cloth from said cushion rubber as it leaves said holding mechanism, and means for applying said cushion rubber to said tread rubber stock over the breaker fabric, said two applying means being arranged to lead said breaker fabric and said cushion rubber forward in substantially parallel paths disposed diagonally to the tread rubber stock.

2. A tread building machine, comprising a conveyor belt for receiving tread rubber stock in an inverted position, breaker fabric feeding mechanism arranged for cooperation with said belt, means for applying said fabric from said feeding mechanism to the rubber stock, cushion rubber holding mechanism positioned adjacent said belt, means for removing the backing cloth from said cushion rubber as it leaves said holding mechanism, guide means for causing said cushion rubber to be led forward directly from said holding mechanism to said tread rubber over the breaker fabric and in substantially the same direction as the breaker fabric is fed forward to said stock, and means for cutting the completed tread stock into predetermined lengths after it leaves the conveyor belt.

3. In a tread building machine, a tread stock forming machine, tread building mechanism including supporting and conveying means, transfer means for delivering stock from said forming machine to said building mechanism, a driving connection between said forming machine and said transfer means for enabling them to be driven in synchronism and means for applying breaker fabric and cushion stock to the tread stock, said latter means being positioned in operative relation to said supporting and conveying means.

4. In a tread building machine, a tread stock forming machine, tread building mechanism including supporting and conveying means, tranfer means for delivering stock from said forming machine to said building mechanism, said transfer means being driven in synchronism with said forming machine, means for applying breaker fabric and cushion stock in parallel paths to the tread stock, said latter means being positioned in operative relation to said supporting and conveying means, and means for cutting the completed tread stock into predetermined lengths as it leaves said supporting and conveying means.

5. In a tread building machine, a conveyor belt for supporting and conveying a continuous length of tread rubber, center rolls for supporting said conveyor, side rolls inclined relative to said rolls arranged to produce a trough in said belt, presser rolls positioned above said belt for cooperation with the tread being built thereon, and means for feeding breaker fabric onto the tread rubber in advance of one of said presser rolls.

6. In a tread building machine, a conveyor belt for supporting and conveying a continuous length of tread rubber, center rolls for supporting said conveyor, side rolls inclined relative to said rolls arranged to produce a trough in said presser rolls positioned above said belt for cooperation with the tread being built thereon, means for feeding breaker fabric onto the tread rubber in advance of one of said presser rolls, and means for feeding cushion stock onto said tread rubber in advance of another of said presser rolls.

7. In a tread building machine, a conveyor belt for supporting and conveying a continuous length of tread rubber, center rolls for supporting said conveyor, side rolls inclined relative to said rolls arranged to produce a trough in said belt, presser rolls positioned above said belt for cooperation with the tread being built thereon, and means for feeding cushion rubber stock onto said tread rubber in advance of one of said presser rolls.

8. In a tread building machine, a conveyor belt for supporting and conveying a continuous length of tread rubber, center rolls for supporting said conveyor, side rolls inclined relative to said rolls arranged to produce a trough in said belt, presser rolls positioned above said belt for cooperation with the tread being built on said belt, an adjustable capacity storage mechanism for breaker fabric associated with said belt, and guiding means for said fabric arranged to apply said fabric to said tread rubber.

9. In a tread building machine, a conveyor belt for supporting and conveying a continuous length of tread rubber, center rolls for supporting said conveyor, side rolls inclined relative to said rolls arranged to produce a trough in said belt, presser rolls positioned above said belt for cooperation with the tread rubber on said belt, storage reels associated with said belt for backed cushion rubber stock, driven reels for winding up the backing removed from said cushion stock as said stock is fed to the belt, and means for applying said stock to the tread rubber.

10. In a tread building machine, a conveyor belt for supporting and conveying a continuous length of tread rubber, center rolls for supporting said conveyor, side rolls inclined relative to said rolls arranged to produce a trough in said belt, presser rolls positioned above said belt for cooperation with the tread being built on said belt, an adjustable capacity storage mechanism for breaker fabric associated with said belt, guiding means for applying said fabric to said tread rubber on said belt, storage reels for backed cushion rubber stock associated with said belt, driven reels for winding up the backing on said cushion stock as it is removed therefrom, and means for applying said stock to the tread rubber.

11. In a tread building machine, a conveyor belt for supporting and conveying a continuous length of tread rubber, center rolls for supporting said conveyor, side rolls inclined relative to said rolls arranged to produce a trough in said belt, presser rolls positioned above said belt for cooperation with the tread being built thereon, storage reels for backed cushion rubber stock associated with said belt, driven reels for winding up the backing on said cushion stock as it is removed therefrom, means for applying said stock to the tread rubber, said storage and wind-up reels being in duplicate, and means for shifting the drive from one wind-up reel to the other to permit of replacement of an empty reel.

12. In a tread forming and finishing machine, an extruding machine for producing the formed rubber stock, a series of conveyors for picking up the stock from said extruding machine, and driving means for said conveyors comprising a disc driven by the mechanism of said extruding machine, a friction wheel adjustable across the face of said disc, a shaft, gearing for driving said shaft from said friction wheel, a mounting for said wheel arranged to permit of the swinging of said wheel about the axis of said shaft out of contact with said disc, and a drive from said shaft to said conveyors.

13. A tread finishing machine, comprising a belt conveyor for receiving a continuous length of formed tread stock, means for forming the conveyor into the approximate form of the inverted stock, and means for applying breaker fabric to said stock.

14. A tread finishing machine, comprising a belt conveyor for receiving a continuous length of formed tread stock, means for forming the conveyor into the approximate form of the inverted stock, means for applying breaker fabric to said stock, and means for applying cushion rubber stock over said breaker fabric.

15. A tread finishing machine, comprising a belt conveyor for receiving a continuous length of formed tread stock, means for forming the conveyor into the approximate form of the inverted stock, means for applying breaker fabric to said stock, and means for severing the completed tread stock into predetermined lengths.

16. A tread finishing machine, comprising a belt conveyor for receiving a continuous length of formed tread stock, means for forming the conveyor into the approximate form of the inverted stock, means for applying breaker fabric to said stock, means for applying cushion rubber stock over said breaker fabric, and means for severing the completed tread stock into predetermined lengths.

17. In a machine of the class described, a belt conveyor adapted to receive a strip of material, and means for forming the conveyor into the approximate shape of the side of the strip in contact therewith comprising center roll means for engaging the central portion of the conveyor and side roll means inclined relative to said center roll means arranged to bend and hold the marginal portions of said belt conveyor in cooperation with the marginal portions of said strip.

18. In a tread building machine, a belt conveyor adapted to receive a tread slab, and means for forming the conveyor into a trough corresponding in shape to the approximate shape of the side of the tread in contact therewith comprising a central element for engaging the central portion of the conveyor and side elements inclined in opposite directions from said central element and arranged to bend and hold the marginal portions of said belt conveyor in cooperation with the marginal portions of said tread slab.

19. In a tread building machine, an inclined conveyor for feeding forward tread stock, and guide means for applying plies of tread material to said stock on said inclined conveyor disposed at an angle to the inclined conveyor and arranged to lead the plies of tread into contact with said tread stock at spaced points on said inclined conveyor.

20. In a tread building machine, a conveyor for feeding forward tread stock, guide means for applying plies of tread material to said stock on said conveyor and disposed at an angle to the conveyor and arranged to lead the plies into contact with said tread stock at spaced points on said conveyor, and roller means at said points for pressing the plies on said tread stock.

21. In a tread building machine, a belt conveyor for feeding forward tread stock, guide means for applying plies of tread material to said stock on said conveyor disposed at an angle to the conveyor and arranged to lead the plies into contact with said tread stock at spaced points on said conveyor, and a plurality of rolls at said points for pressing the plies on said tread stock, said rolls being arranged to permit of the natural elasticity of the conveyor belt exerting pressure over the entire surface of the tread stock.

22. In a machine for assembling a plurality of strips of material into a laminated strip, an extruding machine for forming one of the strips, means for feeding the extruded strip forwarded from said machine, an adjustable drive between said machine and said feeding means for enabling the latter to be driven in synchronism with said machine, and means for applying another strip of material to said extruded strip as the latter is fed forward in a continuous strip from said machine.

23. In a machine for assembling a plurality of strips of material into a laminated sheet, means for feeding forward a continuous strip of material, a stock and liner roll, a liner rewinding roll, a belt drive for said a liner rewinding roll, a belt drive for said rewinding roll driven in synchronism with said feeding means, and guide means positioned to guide onto said strip of material the stock from said stock roll, said stock being removed from said roll and liner solely by the forward propelling of it with said strip due to the mutually adhering portions of said strip and stock and being led directly from said stock roll to said strip.

24. In a machine for assembling a plurality of plies of material into a laminated strip, a horizontal conveyor for feeding a continuous ply forward, an upwardly inclined conveyor above said horizontal conveyor for receiving said ply therefrom, means for applying another ply to said first ply disposed over said inclined conveyor, and another conveyor over said inclined conveyor for conveying the resulting laminated strip away from said inclined conveyor.

In testimony whereof I have hereunto subscribed my name.

ARNOLD R. KRAUSE.